United States Patent
Gunji et al.

(10) Patent No.: US 9,912,873 B2
(45) Date of Patent: Mar. 6, 2018

(54) IMAGE PICKUP APPARATUS EQUIPPED WITH DISPLAY SECTION AND METHOD OF CONTROLLING THE SAME

(71) Applicant: CANON KABUSHIKI KAISHA, Tokyo (JP)

(72) Inventors: Koichi Gunji, Yokohama (JP); Eiichi Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 14/858,135

(22) Filed: Sep. 18, 2015

(65) Prior Publication Data

US 2016/0100145 A1 Apr. 7, 2016

(30) Foreign Application Priority Data

Oct. 3, 2014 (JP) ................................. 2014-204734

(51) Int. Cl.
*G02B 27/00* (2006.01)
*H04N 5/232* (2006.01)
(Continued)

(52) U.S. Cl.
CPC ......... *H04N 5/23293* (2013.01); *G02B 27/00* (2013.01); *G06T 2207/10024* (2013.01);
(Continued)

(58) Field of Classification Search
CPC ........... H04N 5/23293; H04N 5/23216; H04N 13/0484; H04N 1/0044; H04N 1/00161; H04N 1/00167; G06F 1/1643; G06F 3/0484; G06F 3/04842; G05B 2219/35503; G03B 13/02; G02B 23/14
See application file for complete search history.

(56) References Cited

U.S. PATENT DOCUMENTS

2001/0012072 A1* 8/2001 Ueno ................. H04N 5/23293
  348/333.02
2003/0227556 A1* 12/2003 Doyle ................... G06F 3/0481
  348/239
(Continued)

FOREIGN PATENT DOCUMENTS

JP 2006-060496 A 3/2006
JP 2006060496 A * 3/2006

*Primary Examiner* — Nelson D. Hernández Hernández
(74) *Attorney, Agent, or Firm* — Fitzpatrick, Cella, Harper & Scinto

(57) ABSTRACT

An image pickup apparatus that is capable of reducing degradation of image quality of the whole display screen of a display section while improving display delay with respect to an observed area. In an image pickup apparatus, an image pickup section picks up an image of an object, and a development processor generates image data by developing input data acquired by the image pickup section. A first image generation unit generates a first image by performing image processing on part of the image data. A second image generation unit performs predetermined image processing on the image data to thereby generate a second image which is different in the number of steps of image processing from the above image processing. An image synthesis section generates a third image by synthesizing the first image with the second image, and a display device displays the third image.

14 Claims, 12 Drawing Sheets

(51) Int. Cl.
*H04N 5/217* (2011.01)
*H04N 9/04* (2006.01)
(52) U.S. Cl.
CPC ......... *H04N 5/217* (2013.01); *H04N 5/23219* (2013.01); *H04N 9/045* (2013.01)

(56) References Cited

U.S. PATENT DOCUMENTS

2012/0033038 A1\* 2/2012 Cho .................. H04N 13/0011
348/43
2014/0125839 A1\* 5/2014 Shiohara .............. H04N 5/2353
348/229.1

\* cited by examiner

IMAGE PICKUP APPARATUS EQUIPPED WITH DISPLAY SECTION AND METHOD OF CONTROLLING THE SAME

BACKGROUND OF THE INVENTION

Field of the Invention

The present invention relates to an image pickup apparatus equipped with a display section that displays an image to be photographed, and the method of controlling the image pickup apparatus.

Description of the Related Art

A compact digital camera and a non-reflex camera (lens interchangeable camera without a mirror box) are each equipped with a small-sized electronic viewfinder (EVF) for checking an object to be photographed, differently from a single-lens reflex camera. The camera of this type does not need to be equipped with a mirror box by employing the EVF, and hence it is possible to realize reduction of the size and weight of the apparatus body. On the other hand, a certain time period is required to perform image processing for displaying an image to be photographed on the EVF. Therefore, there is a problem that a time difference between an image displayed on the EVF and an object image to be actually photographed is generated, which makes it difficult to photograph the object at a moment intended by the photographer.

Conventionally, most of users of compact digital cameras are not professional cameramen, and hence the above-mentioned display delay in the EVF has not been considered as a serious problem.

However, in recent years, products for amateurs having high awareness of photographing techniques or professional cameramen, represented by a high-class compact camera and a mirrorless camera, have been increased in number, and the problem of display delay cannot be ignored.

To solve the above-mentioned problem of display delay, there has been proposed a technique for reading images from an image pickup device, starting with an object area observed by a user (observed area), and sequentially displaying the images on the EVF starting with an image read from the observed area. Further, there have been proposed a technique for changing the order of reading images and the order of displaying images on the EVF, and further, a technique for omitting image processing with respect to images other than the image read from the observed area (see e.g. Japanese Patent Laid-Open Publication No. 2006-60496).

However, although the above-mentioned technique for reading an image from the observed area first and displaying the image read from the observed area first makes it possible to reduce the time of display delay with respect to the observed area, it requires a dedicated image pickup device which can perform a special reading operation, and a dedicated EVF which can display images in a special order adapted to the dedicated image pickup device. Further, the technique for omitting image processing with respect to images other than the image read from the observed area has a problem that image quality of the whole EVF display image is degraded due to omission of image processing, and if the observed area is in the vicinity of the center of the displayed image, distortion of the image due to the lens becomes noticeable in the peripheral part of the image.

SUMMARY OF THE INVENTION

The present invention provides an image pickup apparatus that is capable of reducing degradation of image quality of the whole display screen of a display section while improving display delay with respect to an observed area, and a method of controlling the image pickup apparatus.

In a first aspect of the invention, there is provided an image pickup apparatus comprising an image pickup unit configured to pick up an image of an object, a development unit configured to generate image data by developing input data acquired by said image pickup unit, a first generation unit configured to generate a first image by performing image processing on part of the image data, a second generation unit configured to perform predetermined image processing, which is larger in the number of processing steps than the image processing performed by said first generation unit, on the image data to thereby generate a second image, a synthesis unit configured to generate a third image by synthesizing the first image with the second image, and a display unit configured to display the third image.

In a second aspect of the invention, there is provided a method of controlling an image pickup apparatus comprising picking up an image of an object, generating image data by developing input data acquired by said picking-up of the image, generating a first image by performing image processing on part of the image data, performing predetermined image processing, which is larger in the number of processing steps than the image processing, on the image data to thereby generate a second image, generating a third image by synthesizing the first image with the second image, and displaying the third image.

According to the present invention, the first image generated by using part of image data, and the second image generated by performing predetermined image processing on the image data, which is different in the number of steps of image processing from image processing performed on the first image, are synthesized to thereby generate the third image, and the generated third image is displayed on the display unit. As a consequence, it is possible to improve the display delay with respect to the observed area by using part of the image data corresponding to the observed area to generate the first image, and at the same time reduce degradation of image quality of the whole display screen of the display section by performing image processing on the other part of the image data than the part of the same corresponding to the observed area.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
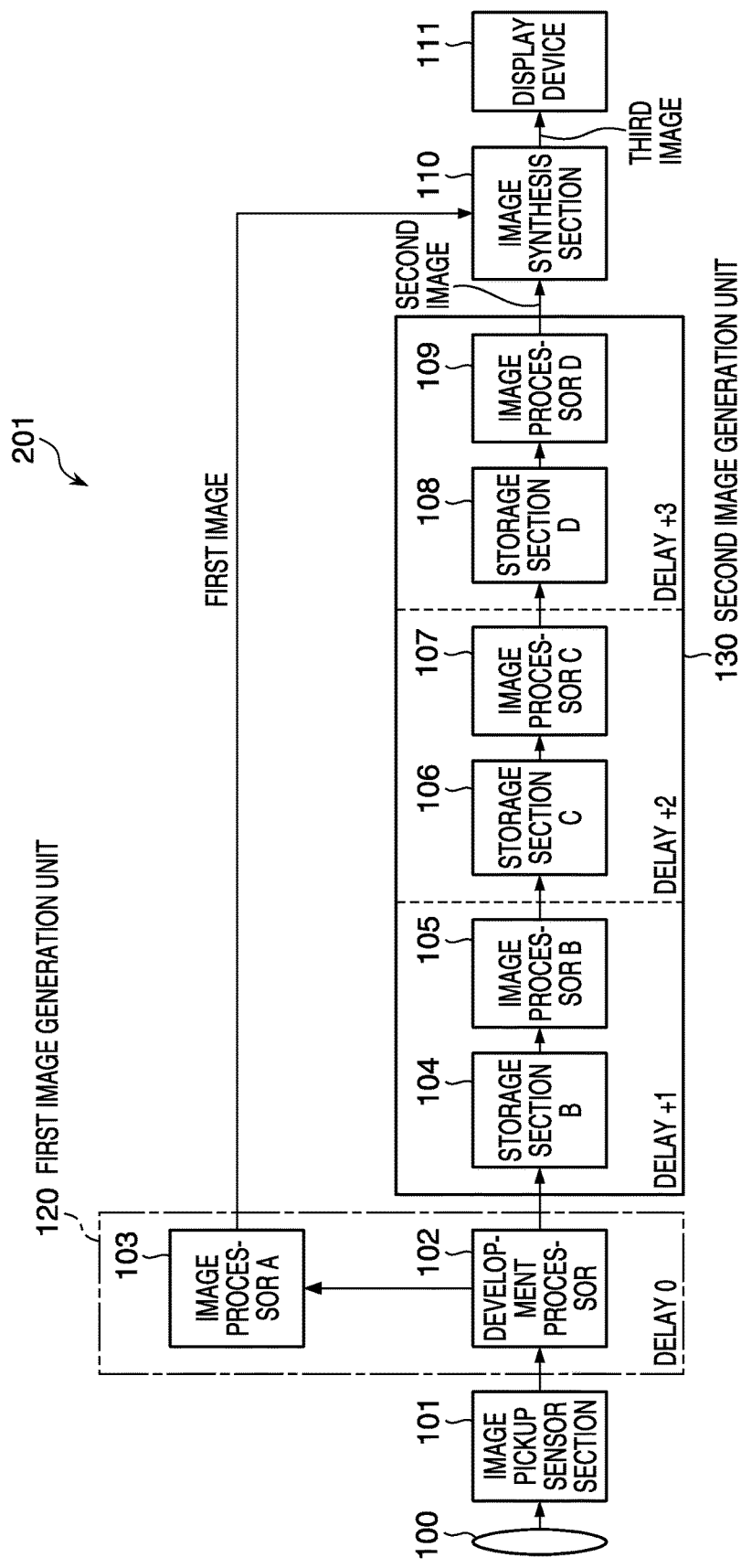
FIG. 1 is a functional block diagram of an image pickup apparatus according to a first embodiment.

FIG. 1 is a functional block diagram of an image pickup apparatus according to a first embodiment. This image pickup apparatus is an apparatus configured to perform photographing by setting an area around the center of a display screen as an observed area, and reduce display delay time for displaying an image of the observed area. The display delay time is a time period that elapses after an image of an object is picked up by an image pickup section before the image is displayed on a display section.

Referring to FIG. 1, the image pickup apparatus, denoted by reference numeral 201, is mainly comprised of a lens group 100, an image pickup sensor section 101, a first image generation unit 120, a second image generation unit 130, an image synthesis section 110 that synthesizes a first image and a second image, and a display device 111 that displays a third image. The first image generation unit 120 includes a development processor 102 and an image processor A 103. The second image generation unit 130 includes a storage section B 104 and an image processor B 105, a storage section C 106 and an image processor C 107, and a storage section D 108 and an image processor D 109.

In this configuration, the lens group 100 adjusts an amount of incident light from an object as well as the focus, and forms a picked up image on the image pickup sensor section 101. The image pickup sensor section 101, which is formed by an image pickup device, such as a CCD or CMOS sensor, photoelectrically converts the image acquired from the lens group 100, further converts the image from analog to digital, and outputs the digital signal. Pixels of the image pickup device each have one of color filters of R (red), G (green), and B (blue), which are arranged e.g. in a mosaic pattern.

Figure 2:
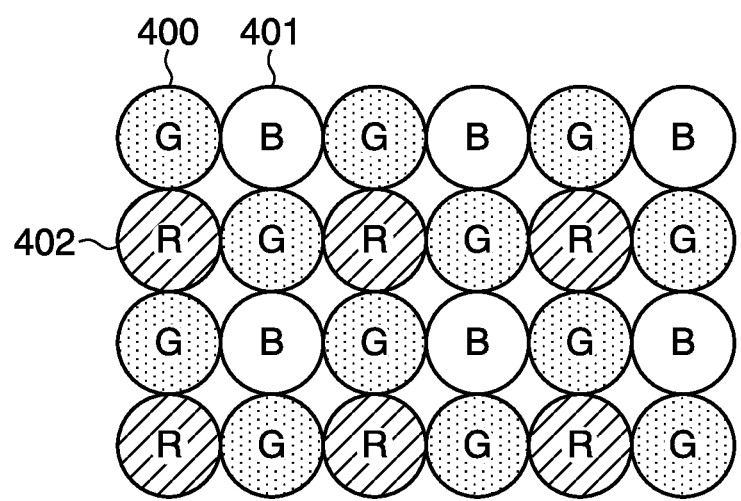
FIG. 2 is a diagram showing an example of pixel array of an image pickup device.

FIG. 2 is a diagram showing an example of pixel array of the image pickup device. Referring to FIG. 2, the pixels of the image pickup device have a structure formed by regularly arraying sets of pixels in a mosaic pattern in which each set is formed by four pixels, i.e. one red pixel 402, one blue pixel 401, and two green pixels 400. This pixel array is generally referred to as the Bayer array.

An electric signal converted by the image pickup sensor section 101 to a Bayer image signal is sent to the development processor 102 of the first image generation unit 120. The development processor 102 receives the Bayer image signal, and performs RGB offset adjustment, gain adjustment, and gamma correction processing on the received image signal. That is, for example, the development processor 102 adjusts white balance by performing offset adjustment and gain adjustment on the received Bayer image signal. In gamma correction, by taking into account the characteristics of the image pickup sensor section 101 and the lens group 100, the image signal is processed using a gamma correction value suitable for generating a recording image desired by a user of the image pickup apparatus. By changing the gamma correction value, it is also possible to generate a recording image on which texture and gradation of a movie film are reproduced, and a recording image to be displayed on a TV monitor.

After performing gamma correction processing, the development processor 102 generates an image having RGB image signals converted to a luminance signal (Y) and color difference signals (Cb, Cr), and stores the generated image in the storage section B 104. The image processor A 103 of the first image generation unit 120 generates a first image using an image of an observed area, which is part of the image data processed by the development processor 102. In doing this, the image processor A 103 determines the size of the first image as part of the image data and a position of the first image in the whole image data according to the observed area set by the user in advance.

The image processor B 105, the image processor C 107, and the image processor D 109 of the second image generation unit 130 sequentially perform image processing on the image stored in the storage section B 104. For example, the image processor B 105 performs processing for lens distortion aberration correction, the image processor C 107 performs noise elimination processing, and the image processor D 109 performs color adjustment processing.

More specifically, the image processor B 105 performs e.g. processing for lens distortion aberration correction on the image stored in the storage section B 104, and stores an output image from the image processor B 105 in the storage section C 106. Further, the image processor C 107 performs e.g. noise elimination processing on the image stored in the storage section C 106, and stores an output image from the image processor C 107 in the storage section D 108. Further, the image processor D 109 performs e.g. color adjustment processing on the image stored in the storage section D 108, and sets an output image from the image processor D 109 as a second image.

Assuming that an amount of delay between an output image from the development processor 102 and an output image from the image processor A 103 is "delay 0" which is a delay amount reference, an amount of delay in the output image from the image processor B 105, which is caused by processing using the storage section B 104 and the image processor B 105, is represented by "delay +1", and an amount of delay in the output image from the image processor C 107, which is caused by processing using the storage section C 106 and the image processor C 107, is represented by "delay +2". Further, an amount of delay in the output image from the image processor C 107, which is caused by processing using the storage section D 108 and the image processor D 109, is represented by "delay +3". The unit of the amount of delay is e.g. a time period for processing one frame (frame time period). For example, a difference in delay between the first image and the second image is e.g. three frame time periods.

The image synthesis section 110 generates the third image by synthesizing the first image output from the image processor A 103 and the second image output from the image processor D 109. The display device 111 is an EVF or a display, and displays the third image synthesized by the image synthesis section 110.

The processors of the image pickup apparatus 201 are each controlled by a CPU of a controller, not shown, to perform a predetermined operation, whereby the third image generated by synthesizing the first image and the second image is displayed on the display device 111.

Next, an image display process performed by the image pickup apparatus 201 shown in FIG. 1 will be described.

Figure 3:
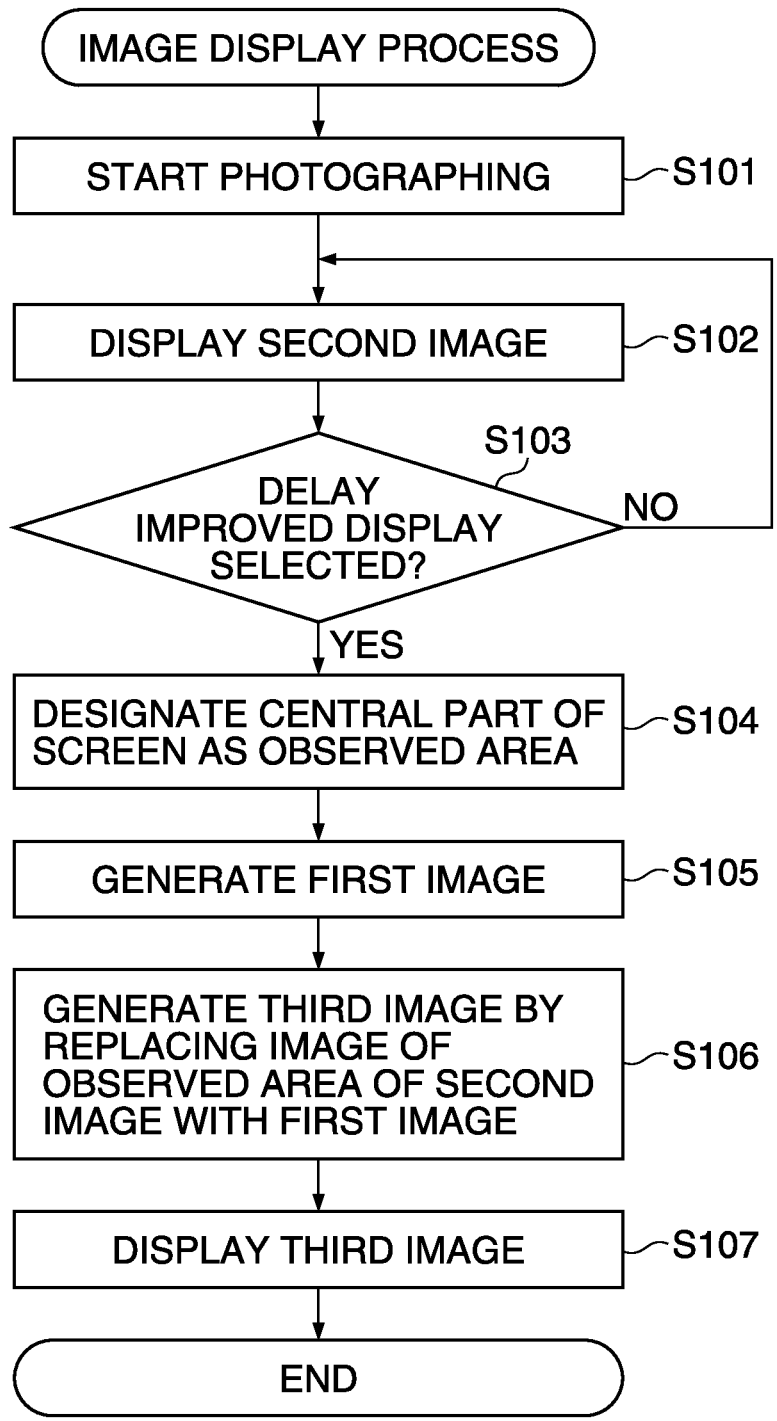
FIG. 3 is a flowchart of an image display process performed by the image pickup apparatus according to the first embodiment.

FIG. 3 is a flowchart of the image display process performed by the image pickup apparatus according to the first embodiment. This image display process is performed by the CPU of the controller, not shown, of the image pickup apparatus 201 shown in FIG. 1, through execution of an image display process program stored in a ROM, also not shown.

Referring to FIG. 3, when the image display process is started, first, the CPU controls the lens group 100 and the image pickup sensor section 101 to start photographing (step S101). Then, the CPU controls the display device 111 to display the second image which is the output image from the image processor D 109 on the display device 111 (step S102). The second image is an image generated by performing predetermined processing on the image processed by the development processor 102 and stored in the storage section B 104, using the image processor B 105, the image processor C 107, and the image processor D 109.

Then, the CPU determines whether or not delay improved display has been selected by a user (step S103). Selection of the delay improved display may be configured to be automatically set when the user presses a shutter button, or can be selectively set according to a user's instruction e.g. for a mode setting. If it is determined in the step S103 that the delay improved display has been selected (YES to the step S103), the CPU designates, for example, a central part of the display screen of the display device 111 as an observed area, according to a setting made by the user in advance (step S104).

Figure 4A:
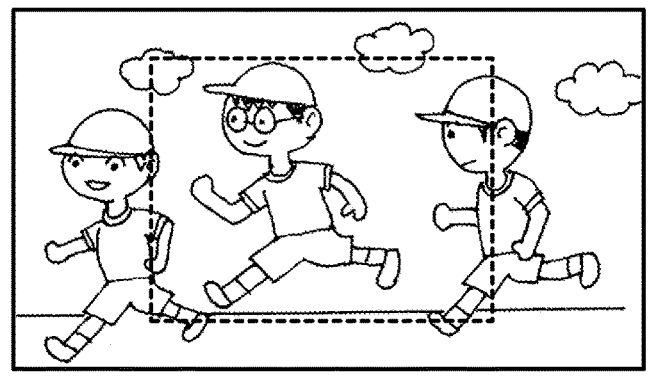
FIGS. 4A to 4C are diagrams each showing an example of a display screen which is displayed on a display device of the image pickup apparatus according to the first embodiment.
Figure 4B:
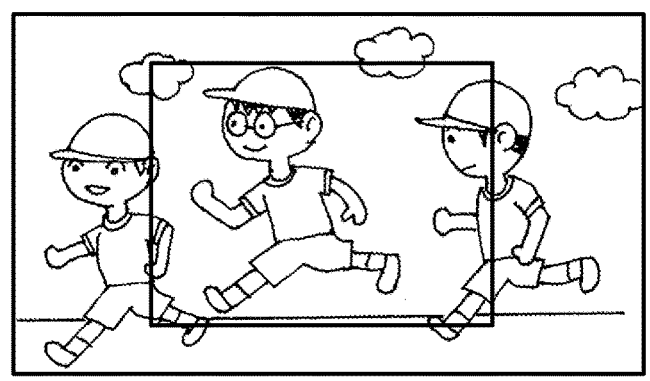
Figure 4C:
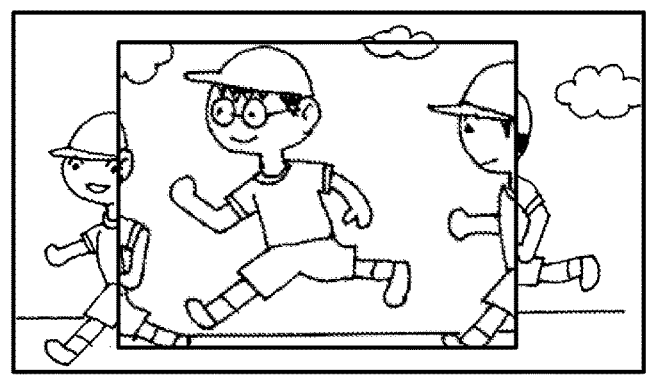

FIGS. 4A to 4C are diagrams each showing an example of the display screen displayed on the display device of the image pickup apparatus according to the first embodiment, in which FIG. 4A shows a state of an image in which the observed area is designated by a broken-line frame, and FIG. 4B shows an image in a state after image substitution in which the frame of the observed area is explicitly indicated using solid lines. Further, FIG. 4C shows a third image in which an image of the observed area (first image) is enlarged and then synthesized with the second image. In FIG. 4A, the central part of the screen is designated as the observed area which is surrounded by the broke-line frame.

It is envisaged that the size of the observed area may be set by a method of designating the number of pixels, a method of designating a ratio of the observed area to the whole display screen, a method of following a user's instruction, and a method of making the size variable depending on the size of an object to be observed. Further, the position of the observed area is not limited to the central part of the screen, but for example, if there is no object to be observed in the central part of the screen, the observed area may be at a location other than the central part. The method of selecting the observed area and the size and position of the observed area are not particularly limited.

Referring back to FIG. 3, after the observed area is set in the central part of the image (step S104), the CPU generates the first image using part of the image corresponding to the observed area, based on the output value from the development processor 102 (step S105). Then, the CPU controls the image synthesis section 110 to generate the third image by replacing the observed area of the second image with the first image (step S106). When replacing the image, the second image and the first image are different in delay time and the number of steps of image processing, and hence misregistration or quality difference between the images may be caused. The method of generating the third image is not limited to a method of simply replacing an image, but, as shown in FIG. 4B, may be a method of intentionally showing a frame of the observed area after image replacement using solid lines to make the user aware of the frame, thereby reducing the sense of oddness. Further, the boundary between the first image and the second image can be made inconspicuous by blurring the boundary by filter processing, or gradually changing the synthesis ratio. The observed areas in the first image and the second image are generally set to the same size and position in the display screen. However, besides displaying the observed area without changing an angle of view, the third image may be generated by synthesizing an image generated by enlarging the observed area of the first image, with the second image, as shown in FIG. 4C, to thereby assist the user in checking an image of the observed area. These methods of display may be adaptively selected according to a scene, or further, may be set according to a user's instruction. Note that details of the methods of filter processing and synthesis processing per se are known, and hence description thereof is omitted.

Referring back to FIG. 3, after the third image is generated, the CPU controls the display device 111 to display the third image on the display screen of the display device 111 (step S107), followed by terminating the present process. Then, the CPU starts recording the image of the object.

On the other hand, if it is determined in the step S103 that the delay improved display has not been selected (NO to the step S103), the CPU returns to the step S102, and waits for the user to select the delay improved display while displaying the second image.

According to the image display process in FIG. 3, the processing operations performed by the image processor B 105, the image processor C 107, and the image processor D 109 are omitted with respect to the first image as the image of the observed area, and hence it is possible to improve delay conventionally caused before the observed area is displayed on the display device. Further, the first image as the image of the observed area is set in a central area of the display screen, and hence it is possible to prevent distortion in the peripheral part of the image, which is liable to occur in the third image generated by synthesizing the first image with the second image. Note that basic image processing including offset adjustment, gain adjustment, and gamma correction is performed by the development processor 102, and hence it is possible to prevent image quality of the whole display screen from being extremely degraded.

In the present embodiment, as the storage section B 104, the storage section C 106, and the storage section D 108, a memory, such as a RAM, is used. These storage sections may be formed by a single storage section which is used through address control, or may be formed by a plurality of respective storage sections.

In the present embodiment, it is desirable that synchronization of the driving period of the image pickup device, the driving period of each storage section, and the driving period of the EVF can be controlled. For example, an amount of delay between synchronization signals for the image pickup device and the EVF may be measured, and with reference to the driving period of the image pickup device, it is possible to control the amount of delay of each of synchronization signal for the respective driving periods of the storage sections and the driving period of the EVF, such that the amount of delay is within a predetermined range. The driving period of the image pickup device and that of the EVF can be easily controlled if the image pickup device and the EVF are driven at the same period. However, the driving period of the image pickup device and that of the EVF are not limited to the same period.

In the present embodiment, it is preferable that the image processor A 103 performs at least one of processing for lens distortion aberration correction, noise elimination processing, and color adjustment processing, on part of the image data generated by the development processor 102. This makes it possible to improve the image quality of the first image which is synthesized with the second image, and thereby make the image quality of the first image close to that of the second image. The number of steps of image processing performed by the image processor A 103 on the above-mentioned part of the image data is determined according to e.g. the display delay time allowed by the user.

In the present embodiment, the development processor 102 performs at least one of RGB offset adjustment, gain adjustment, and gamma correction processing, on the Bayer image signal as the input data. A range of processing to be performed is determined e.g. based on the display delay time allowed by the user.

In the present invention, in synthesis processing for synthesizing the first image with the second image, it is preferable to perform filter processing or the like on a boundary between the second image and the first image, and thereby make the boundary inconspicuous.

In the present embodiment, it is preferable that when synthesizing the first image with the second image, the image synthesis section 110 synthesizes the images by taking into account hand shake correction and a motion of the camera (panning). This makes it possible to reduce a difference in motion at the boundary between the second image and the first image.

Next, a description will be given of a second embodiment of the present invention with reference to the drawings.

Figure 5:
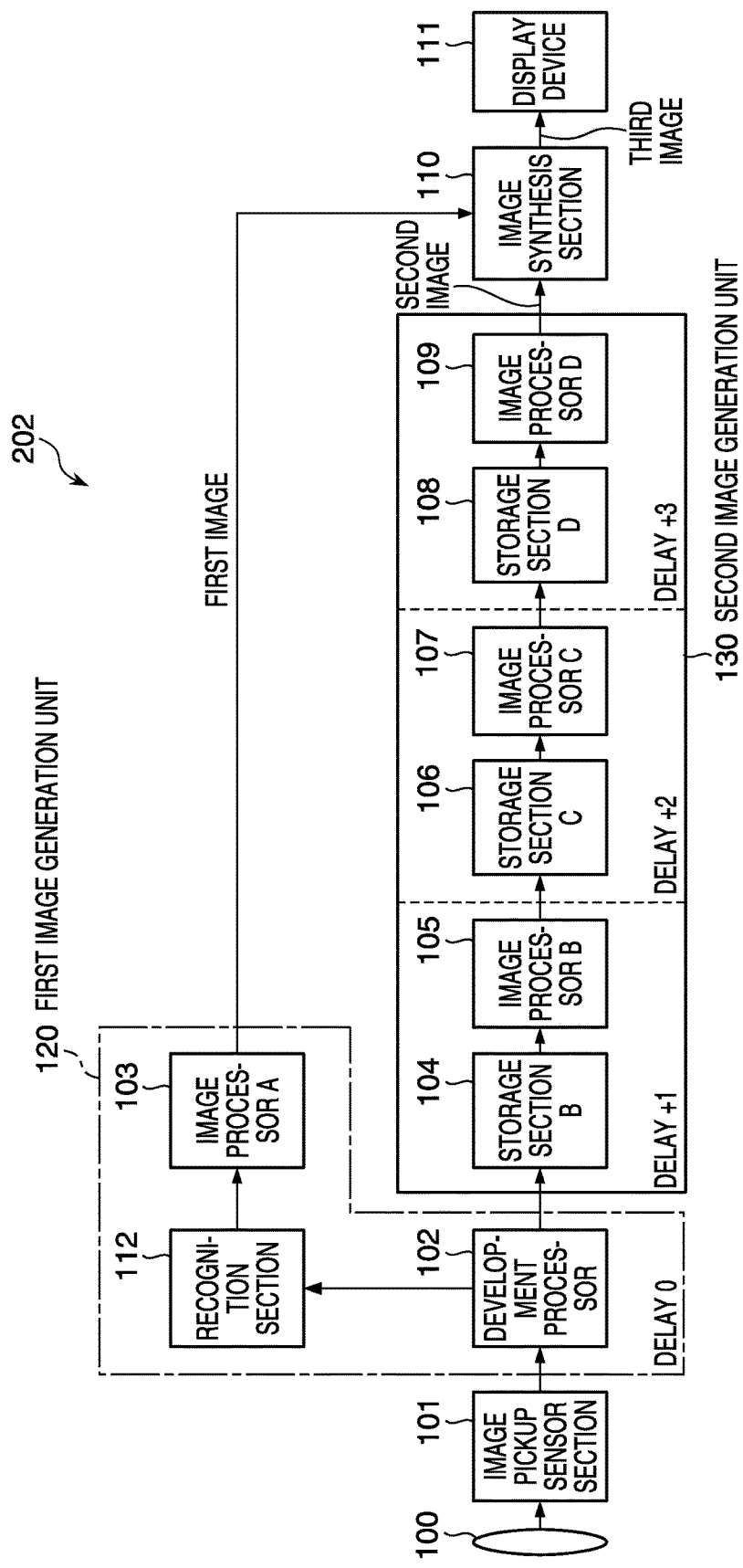
FIG. 5 is a functional block diagram of an image pickup apparatus according to a second embodiment.

FIG. 5 is a functional block diagram of an image pickup apparatus according to the second embodiment. This image pickup apparatus is an apparatus which is configured to perform photographing by determining an observed area by an object recognition function, and is capable of coping with a case where the observed area desired by a user is not in a central area of the screen.

Referring to FIG. 5, the image pickup apparatus, denoted by reference numeral 202, has the same basic configuration as that of the above-described image pickup apparatus 201 shown in FIG. 1. Therefore, the same components as those of the image pickup apparatus 201 are denoted by the same reference numerals, and description thereof is omitted. The following description will be given mainly of different points of the image pickup apparatus 202 according to the present embodiment from the image pickup apparatus 201 according to the first embodiment.

The image pickup apparatus 202 differs from the image pickup apparatus 201 shown in FIG. 1 in that a recognition section 112 is provided between the development processor 102 and the image processor A 103 of the first image generation unit 120. The recognition section 112 is a block that recognizes a face of a person as an object, identifies a person, or recognizes a physical object. Although the recognition section 112 is formed as a block independent of the image processor A 103 for the convenience of explanation, the image processor A 103 to which the function of the recognition section 112 is added can also be used.

Figure 6:
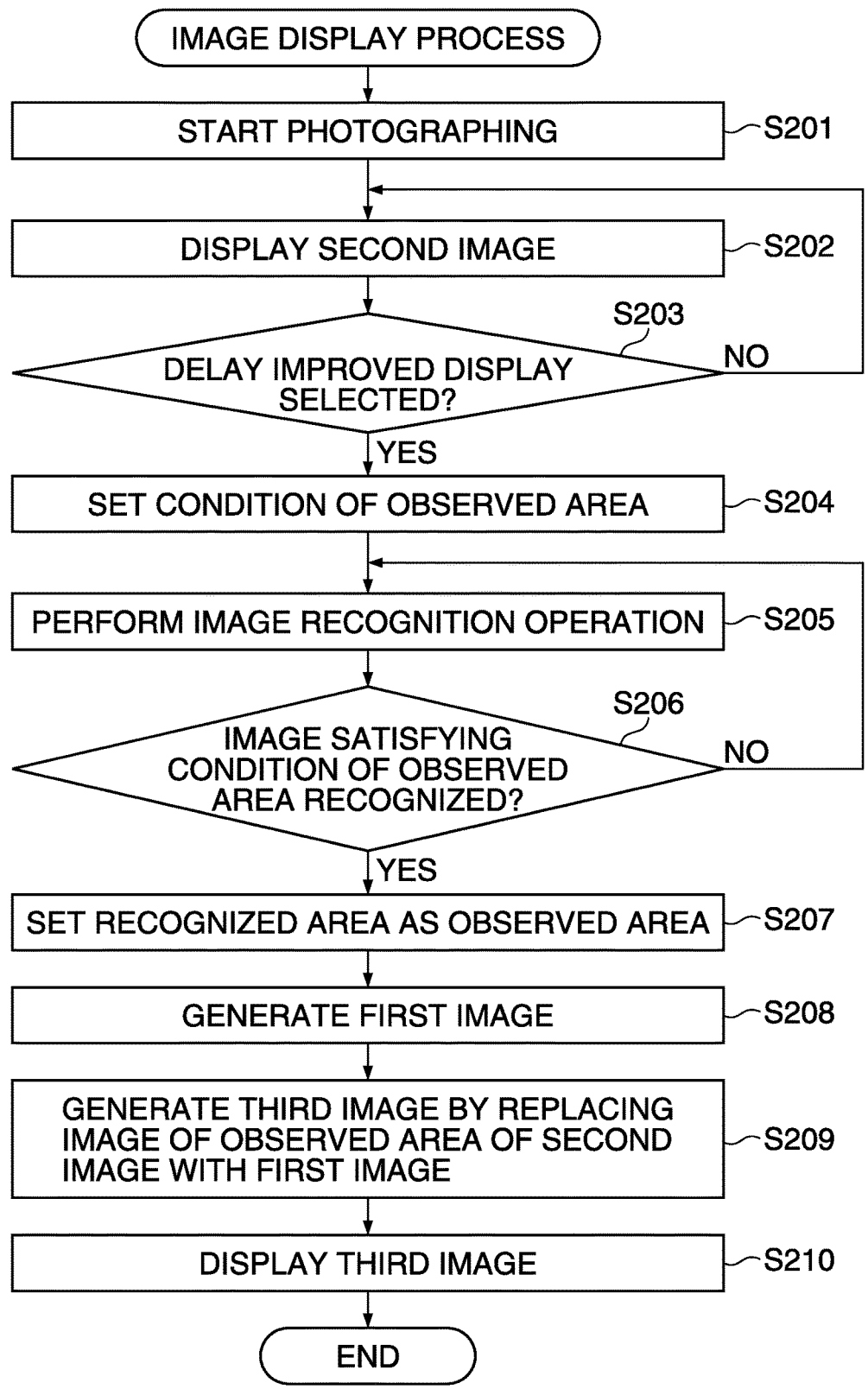
FIG. 6 is a flowchart of an image display process performed by the image pickup apparatus according to the second embodiment.

FIG. 6 is a flowchart of an image display process performed by the image pickup apparatus according to the second embodiment. This image display process is performed by the CPU of the controller, not shown, of the image pickup apparatus 202, through execution of an image display process program stored in the ROM, also not shown.

The following description will be given mainly of different points of the image display process performed by the image pickup apparatus 202 shown in FIG. 5 from the image display process (FIG. 3) performed by the image pickup apparatus 201 according to the first embodiment.

Referring to FIG. 6, when the image display process is started, similarly to the above-described image display process performed by the image pickup apparatus 201 according to the first embodiment, the CPU starts photographing, controls the display device 111 to display the second image on the display device 111, and determines whether or not the delay improved display has been selected (steps S201 to S203).

If it is determined in the step S203 that the delay improved display has been selected (YES to the step S203), the CPU sets a condition of the observed area (step S204). In the present embodiment, it is assumed that the condition is that a "face" of a person or a "bouquet of flowers" is recognized in the observed area. The condition of the observed area may be designated from the outside after a user confirms an image on the display device 111 or may be designated by registering information on a physical object in advance.

After the condition of the observed area is set (step S204), the CPU causes the image recognition operation to be performed (step S205). That is, the CPU controls the recognition section 112 to recognize an image which satisfies the condition set for determining the observed area, such as a face and a bouquet, on the display screen of the display device 111.

Then, the CPU determines whether or not an image which satisfies the condition of the observed area has been recognized (step S206). If it is determined in the step S206 that the recognition section 112 has recognized the image (face or bouquet) which satisfies the condition of the observed area (YES to the step S206), the CPU sets the recognized area as the observed area (step S207), as shown in FIG. 7.

Figure 7:
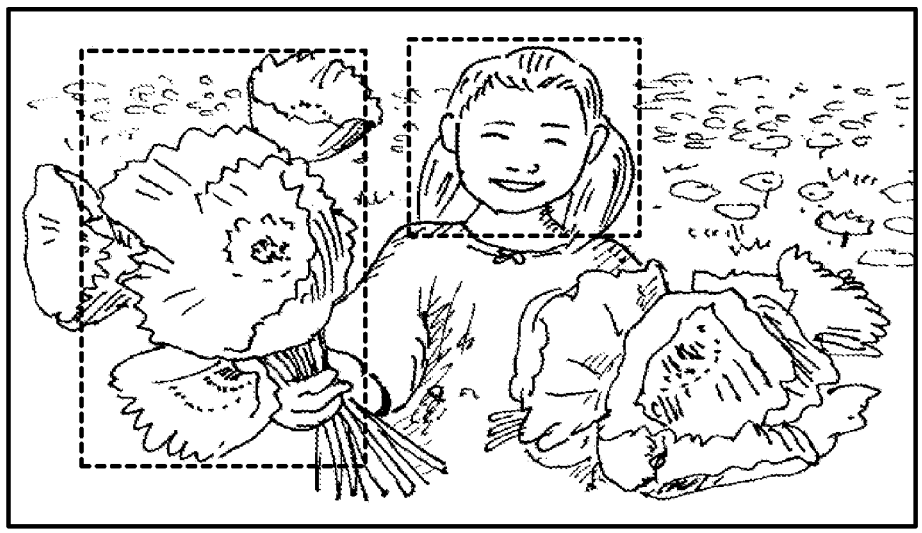
FIG. 7 is a diagram showing an example of a display screen which is displayed on a display device of the image pickup apparatus according to the second embodiment.

FIG. 7 is a diagram showing an example of the display screen displayed on the display device of the image pickup apparatus according to the second embodiment. FIG. 7 shows a case where a plurality of observed areas are set, and more specifically, in the illustrated example, a face of a person and a bouquet, surrounded by broken lines, are set as the observed areas.

After the observed areas are set (step S207), the CPU cuts out a plurality of parts of images corresponding to the observed areas from output values from the development processor 102 to thereby generate first images (step S208). Then, the CPU replaces the images of the observed areas of the second image with the first images to thereby generate the third image, similarly to the first embodiment (FIG. 3) (step S209). In doing this, the CPU replaces the images of the two observed areas of the second image with the two first images corresponding thereto. After generating the third image (step S209), the CPU controls the display device 111 to display the third image on the display device 111 (step S210), followed by terminating the present process. Then, the CPU starts recording the image.

On the other hand, if it is determined in the step S203 that the delay improved display has not been selected (NO to the step S203), the CPU returns to the step S202, and waits until the delay improved display is selected. Further, if it is determined in the step S206 that an image satisfying the condition of the observed area has not been recognized (NO to the step S206), the CPU returns to the step S205, and continues the image recognition operation.

According to the image display process in FIG. 6, similarly to the first embodiment, the processing operations performed by the image processor B 105, the image processor C 107, and the image processor D 109 are omitted with respect to the first images corresponding to the observed areas, and hence it is possible to improve the delay conventionally caused before the first image is displayed on the display device. Further, since the recognition section 112 for recognizing the observed area is provided, it is possible to quickly recognize the first image(s) associated with the observed area(s), and display the third image obtained by synthesizing the first image(s) and the second image. Therefore, this also makes it possible to improve display delay.

Further, basic image processing including offset adjustment, gain adjustment, and gamma correction is performed by the development processor 102, and hence it is possible to prevent the image quality of the whole display screen from being very much degraded.

In the present embodiment, the number and size of the observed areas are not particularly limited, but can be changed as desired by a user on an as-needed basis.

Next, a description will be given of a third embodiment of the present invention with reference to drawings.

Figure 8:
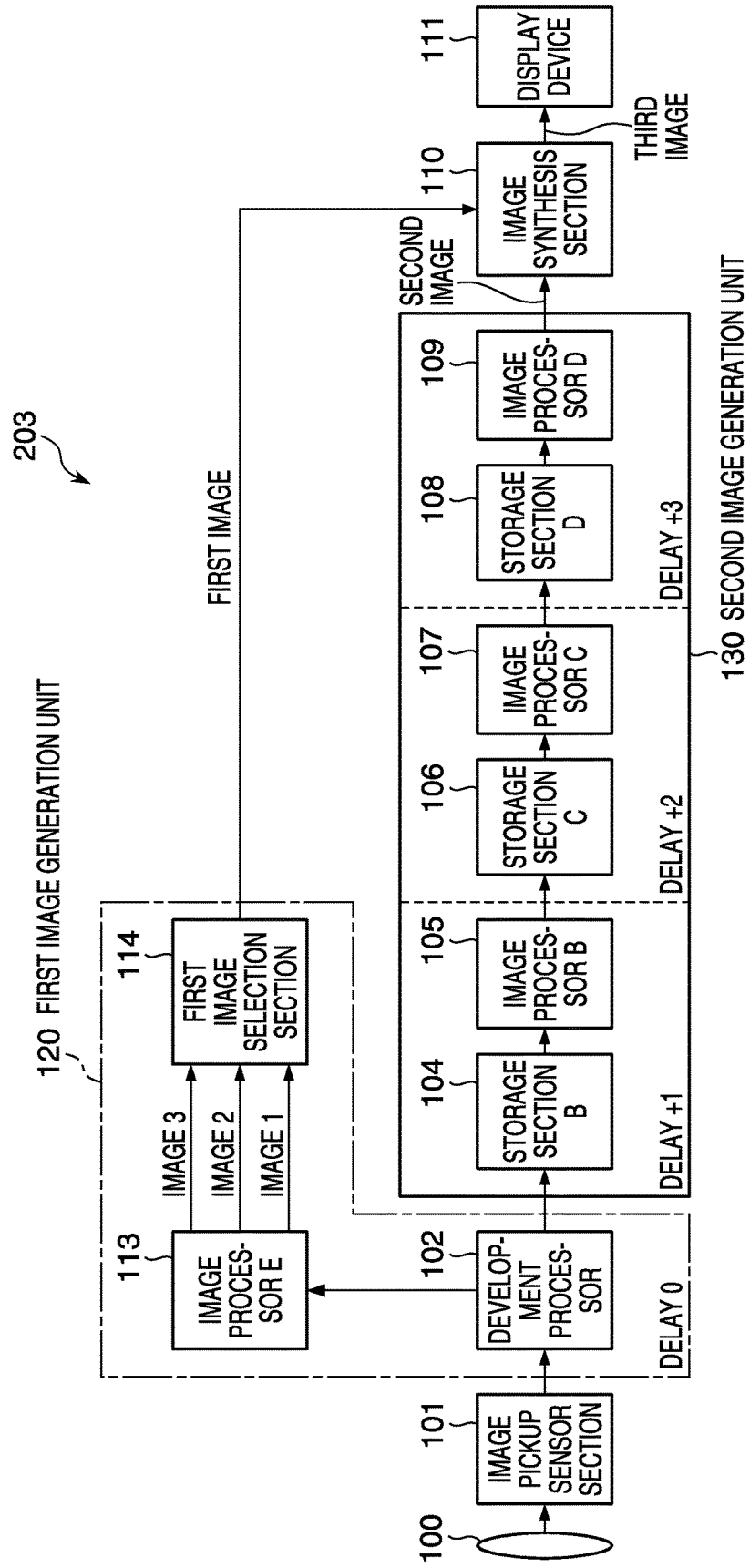
FIG. 8 is a functional block diagram of an image pickup apparatus according to a third embodiment.

FIG. 8 is a functional block diagram of an image pickup apparatus according to the third embodiment. This image pickup apparatus is configured to change details of processing performed when generating the first image, depending on the size of the observed area.

Referring to FIG. 8, the image pickup apparatus, denoted by reference numeral 203, has the same basic configuration as that of the above-described image pickup apparatus 201 shown in FIG. 1. Therefore, the same components as those of the image pickup apparatus 201 are denoted by the same reference numerals, and description thereof is omitted. The following description will be given mainly of different points of the image pickup apparatus 203 according to the present embodiment from the image pickup apparatus 201 according to the first embodiment.

The image pickup apparatus 203 differs from the image pickup apparatus 201 shown in FIG. 1 in that an image processor E 113 and a first image selection section 114 are provided in place of the image processor A 103 of the first image generation unit 120, appearing in FIG. 1. The image processor E 113 performs a plurality of different image processing operations on image data output from the development processor 102 with respect to the observed area to thereby generate a plurality of images, and outputs the generated images as images to be each used as the first image. Examples of the plurality of processing operations include the same processing operations as those performed by the image processor A 103, the image processor B 105, the image processor C 107, and the image processor D 109, respectively, and processing operations which are partially simplified versions of the above-mentioned processing operations. The image processor E 113 outputs a plurality of images as images to be each used as the first image, for example, an image 1, an image 2, and an image 3, to the first image selection section 114, according to different details of the processing.

The image 2 is an image subjected to higher-level processing than the image 1, and the image 3 is an image subjected to even higher-level processing than the image 2. The first image selection section 114 determines the first image by selecting one image out of the plurality of images as the images to be each used as the first image, which are output from the image processor E 113. In this case, the first image selection section 114 selects one image using the size of the observed area selected by the user as a reference. The reference for selection will be described hereinafter.

Figure 9:
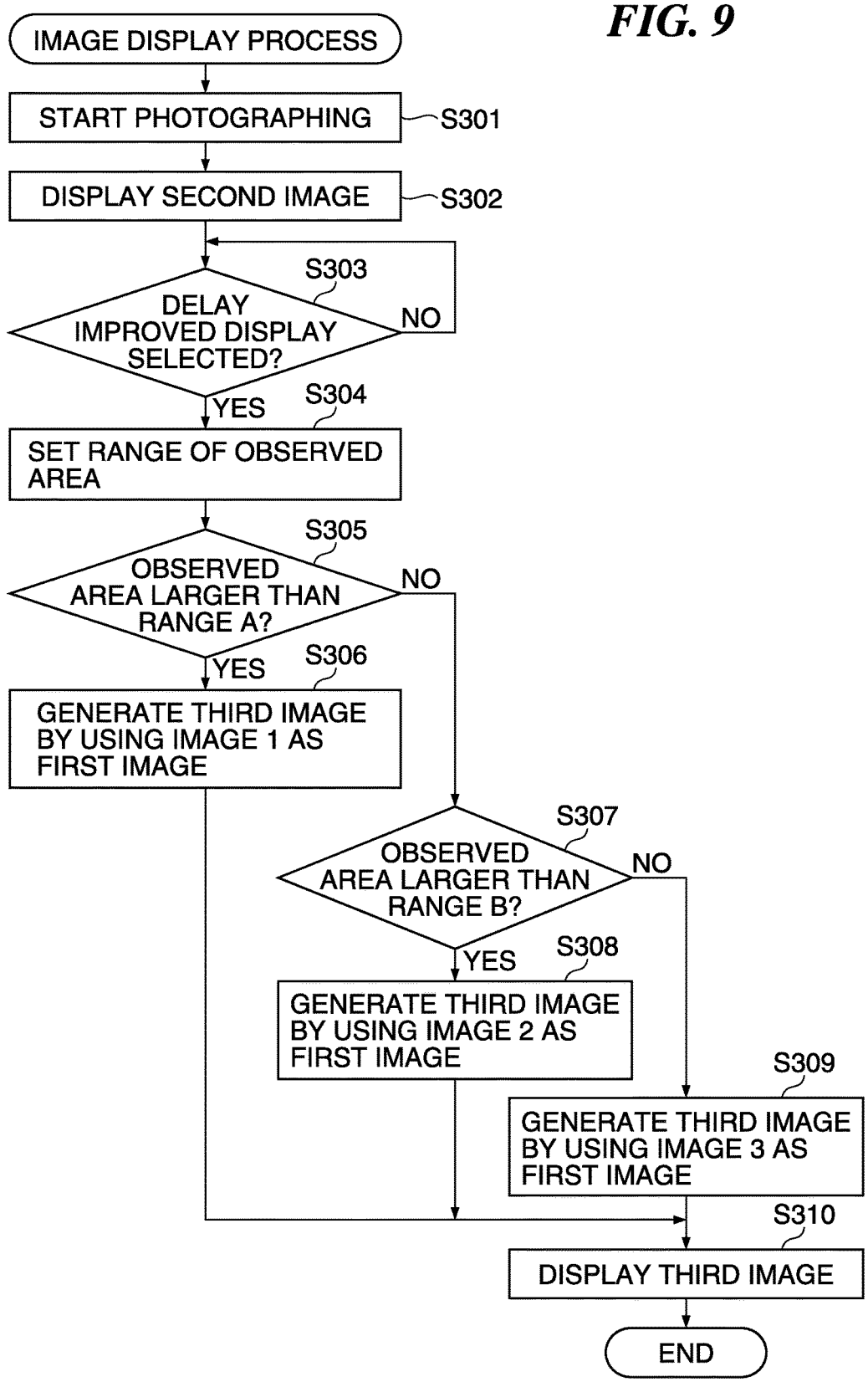
FIG. 9 is a flowchart of an image display process performed by the image pickup apparatus according to the third embodiment.

FIG. 9 is a flowchart of an image display process performed by the image pickup apparatus according to the third embodiment. This image display process is performed by the CPU of the controller, not shown, of the image pickup apparatus 203, through execution of an image display process program stored in the ROM, also not shown.

The following description will be given mainly of different points of the image display process performed by the image pickup apparatus 203 shown in FIG. 8 from the image display process (FIG. 3) performed by the image pickup apparatus 201 according to the first embodiment.

Referring to FIG. 9, when the image display process is started, similarly to the above-described image display process performed by the image pickup apparatus according to the first embodiment, the CPU starts photographing, controls the display device 111 to display the second image on the display device 111, and determines whether or not the delay improved display has been selected (steps S301 to S303).

Figure 10:
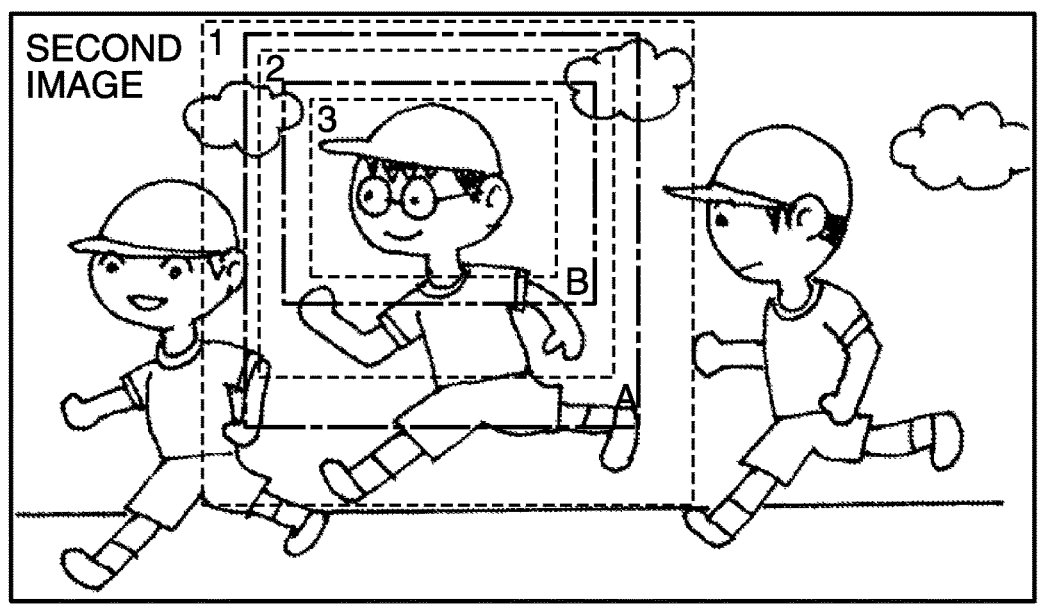
FIG. 10 is a diagram showing an example of a display screen which is displayed on a display device of the image pickup apparatus according to the third embodiment.

If it is determined in the step S303 that the delay improved display has been selected (YES to the step S303), the CPU sets a range of the observed area which is designated e.g. by a user (step S304). FIG. 10 shows a display screen displayed on the display device of the image pickup apparatus according to the third embodiment, for prompting the user to designate a range of the observed area. Referring to FIG. 10, a range A surrounded by dashed single-dotted lines and a range B surrounded by dashed double-dotted lines are shown on the display screen. For example, the user designates an observed area having a desired size by selecting one of the areas on the screen shown in FIG. 10. Besides designating the range of the observed area according to user's selection as described above, the range of the observed area may be designated by a method of registering information on a physical object as a setting in advance and designating a range which accommodates the physical object on which the information is registered.

For example, after the range of the observed area is set based on the user's designation (step S304), the CPU determines whether or not the observed area which has been recognized is larger than the range A in FIG. 10 (step S305). If it is determined in the step S305 that the observed area is larger than the range A (YES to the step S305), the CPU selects the image 1 processed by the first image generation unit 120 appearing in FIG. 8, as the first image, and sends the image 1 to the image synthesis section 110. Then, the CPU controls the image synthesis section 110 to generate the third image by synthesizing the image 1 with the second image (step S306), and controls the display device 111 to display the third image on the display device 111 (step S310), followed by terminating the present process. Note that the method of generating the third image is the same as that used in the first embodiment.

On the other hand, if it is determined in the step S305 that the observed area is not larger than the range A (NO to the step S305), the CPU determines whether or not the observed area is larger than the range B (step S307). If it is determined in the step S307 that the observed area is larger than the range B (YES to the step S307), the CPU selects the image 2 generated by the first image generation unit 120 appearing in FIG. 8, as the first image, and sends the image 2 to the image synthesis section 110. Then, the CPU controls the image synthesis section 110 to generate the third image by synthesizing the image 2 with the second image (step S308), and then proceeds to the step S310.

Further, if it is determined in the step S307 that the observed area is not larger than the range B (NO to the step S307), the CPU selects the image 3 generated by the first image generation unit 120 appearing in FIG. 8, as the first image, and sends the image 3 to the image synthesis section 110. Then, the CPU controls the image synthesis section 110 to generate the third image by synthesizing the image 3 with the second image (step S309), and then proceeds to the step S310.

On the other hand, if it is determined in the step S303 that the delay improved display has not been selected (NO to the step S303), the CPU returns to the step S302, and waits until the delay improved display is selected.

According to the image display process in FIG. 9, it is possible to change details of processing performed when generating the first image according to a size of the observed area which is prepared in plurality with respective different sizes. For example, as processing operations to be performed in a case where the observed area is the smallest, it is possible to select from a processing operation performed by the image processor A 103 appearing in FIG. 1, and all or most of processing operations performed by the image processor B 105, the image processor C 107, and the image processor D 109, each appearing in FIG. 8. When the screen is small, it does not take much time to complete processing and hence it is possible to perform complicated processing. This makes it possible to improve the image quality of the observed area to substantially the same level as the second image, and hence it is possible to prevent the image quality of the whole display image from being degraded.

In the present embodiment, as the observed area is smaller, the image processor E 113 makes higher in level the details of processing performed with respect to the observed area. For example, the smallest image 3 is an image generated by performing processing on part of the image processed by the development processor 102, using the image processor B 105, the image processor C 107, and the image processor D 109. Further, the image 2 larger than the image 3 is an image generated by performing processing on part of the image processed by the development processor 102, using the image processor B 105 and the image processor C 107. Further, the image 1 larger than the image 2 is an image generated by performing processing on part of the image processed by the development processor 102, only using the image processor B 105.

In the present embodiment, processing performed by the image processor B 105 is e.g. processing for lens distortion aberration correction. Further, processing performed by the image processor C 107 is e.g. noise elimination processing, and processing performed by the image processor D 109 is e.g. color adjustment processing.

In the present embodiment, details of the processing performed to obtain the image 1, the image 2, and the image 3 are preferably determined according to processing time which can be assigned to the image processor E 113.

Although in the present embodiment, the range A and the range B are described as examples of the range for reference for use in setting an observed area, for the convenience of explanation, the number of the ranges is not particularly limited. Therefore, the number of the ranges may be increased according to the types of image processing performed by the image processor E 113 or time periods required to perform image processing performed by the same.

Further, in the present embodiment, the number of outputs from the image processor E 113 is not particularly limited, but it is only required to be one or more. Note that the time required to perform processing by the image processor E 113 is different depending on details of the processing, and hence there is a case where the processing is not completed within a desired time period, depending on the size of the observed area. Therefore, the first image selection section 114 is controlled not to select an image on which processing has not been completed even if the image is the one output from the image processor E 113.

Next, a description will be given of a fourth embodiment of the present invention with reference to the drawings.

Figure 11:
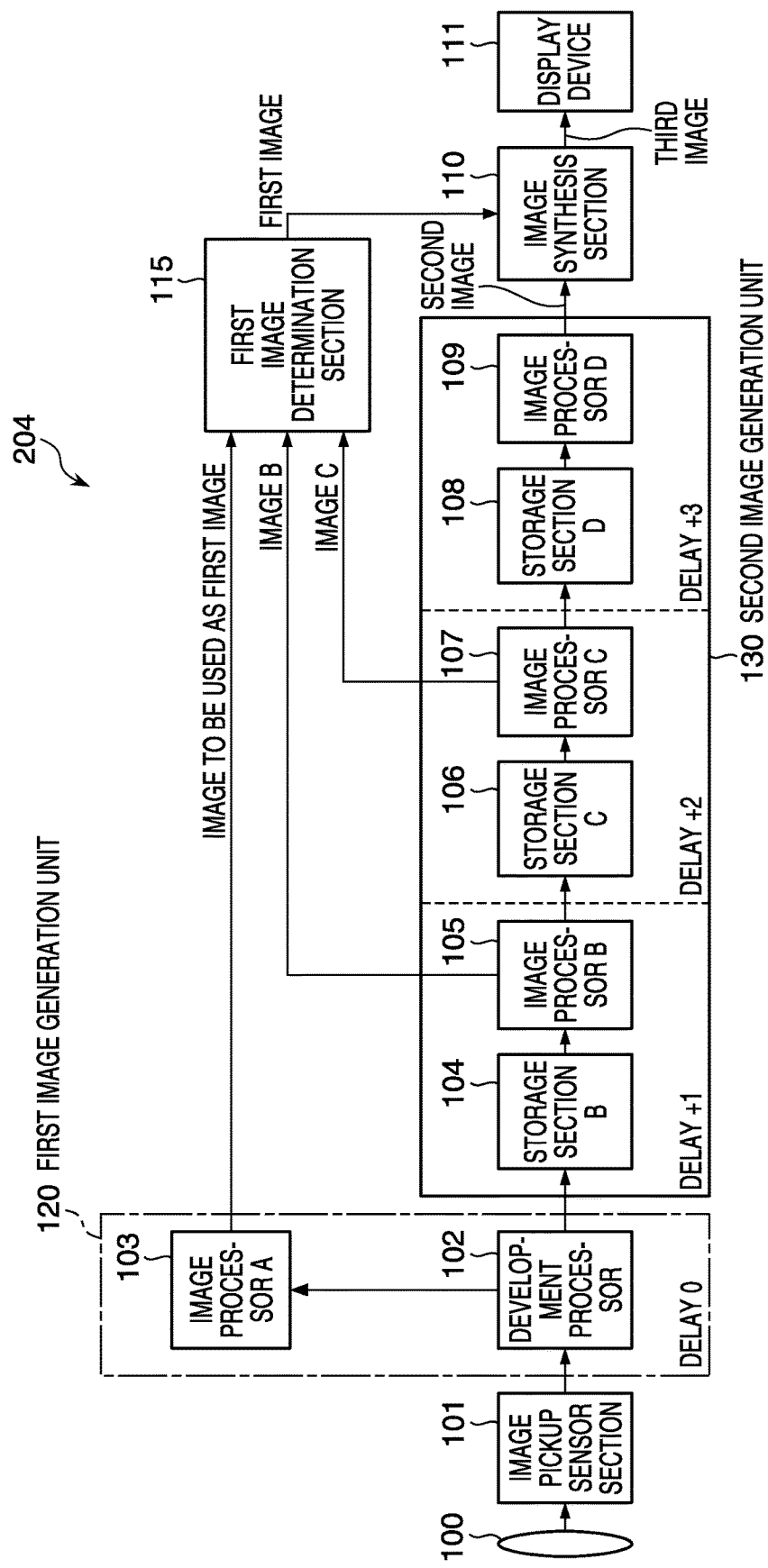
FIG. 11 is a functional block diagram of an image pickup apparatus according to a fourth embodiment.

FIG. 11 is a functional block diagram of an image pickup apparatus according to the fourth embodiment. This image pickup apparatus is configured to change details of processing performed when generating the first image according to the length of display delay time allowed by a user.

A time period allowable as the display delay time is different depending on each user. If the allowable time period is long, image processing for improving display image quality can be performed accordingly. On the other hand, if the allowable time is short, it is required to make the image processing time as short as possible. In this case, the time spent for performing image processing is short and hence image quality is degraded accordingly.

Referring to FIG. 11, the image pickup apparatus, denoted by reference numeral 204, has the same basic configuration as that of the above-described image pickup apparatus 201 shown in FIG. 1. Therefore, the same components as those of the image pickup apparatus 201 are denoted by the same reference numerals, and description thereof is omitted. The following description will be given mainly of different points of the image pickup apparatus 204 according to the present embodiment from the image pickup apparatus 201 according to the first embodiment.

The image pickup apparatus 204 shown in FIG. 11 differs from the image pickup apparatus 201 shown in FIG. 1 in that a first image determination section 115 is added. The first image determination section 115 determines the first image from images output from the image processor A 103 as images to be each used as the first image, an image B output from the image processor B 105, and an image C output from the image processor C 107, and sends the determined first image to the image synthesis section 110. Note that the image processor A 103 generates one or more images as images to be each used as the first image. Further, the image B and the image C are output from the image processor B 105 and the image processor C 107, respectively, and are cut out as images which have the same size as the first image and include the same observed area as the first image. The image B and the image C correspond to the above-mentioned images to be each used as the first image, and in other words, the other images to be each used as the first image.

Figure 12:
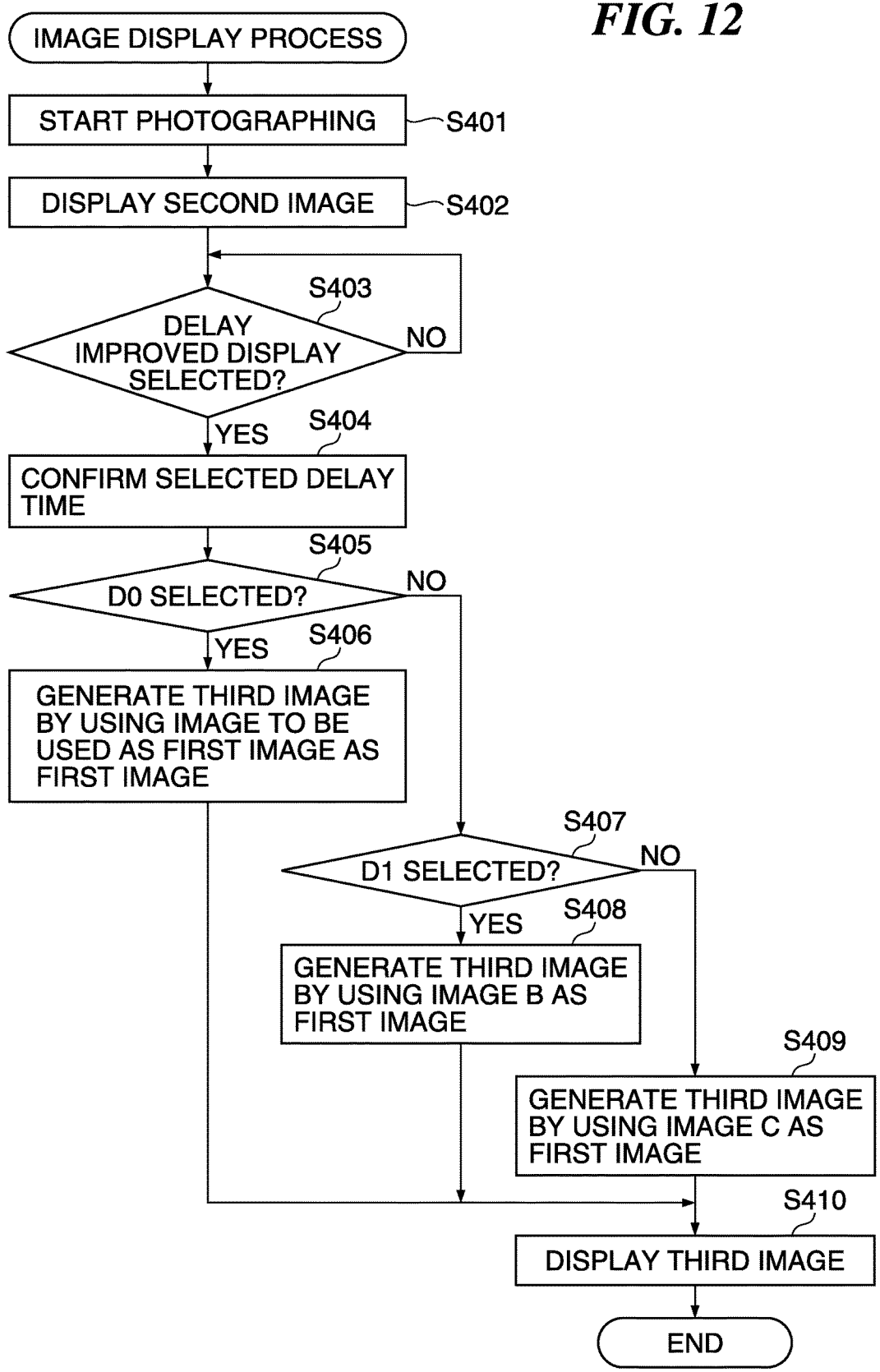
FIG. 12 is a flowchart of an image display process performed by the image pickup apparatus according to the fourth embodiment.

FIG. 12 is a flowchart of an image display process performed by the image pickup apparatus according to the fourth embodiment. This image display process is performed by the CPU of the controller, not shown, of the image pickup apparatus 204, through execution of an image display process program stored in the ROM, also not shown.

The following description will be given mainly of different points of the image display process performed by the image pickup apparatus 204 shown in FIG. 11 from the image display process (FIG. 3) performed by the image pickup apparatus 201 according to the first embodiment.

Referring to FIG. 12, when the image display process is started, similarly to the above-described image display process performed by the image pickup apparatus according to the first embodiment, the CPU starts photographing, and controls the display device 111 to display the second image on the display device 111, and determines whether or not the delay improved display has been selected (steps S401 to S403).

If it is determined in the step S403 that the delay improved display has been selected (YES to the step S403), the CPU confirms the display delay time selected by the user (step S404). The user sets the display delay time, which is allowable, in advance or in response to a request from the CPU. The display delay time is set to D0=3 ms, D1=5 ms, or D2=10 ms, for example.

After confirming the setting of the display delay time (step S404), the CPU determines whether or not D0 has been selected as the display delay time (step S405). If it is determined in the step S405 that D0 has been selected (YES to the step S405), the CPU controls the first image determination section 115 to select one of the images to be each used as the first image as the first image in FIG. 11. Then, the CPU controls the image synthesis section 110 to generate the third image by synthesizing the selected first image with the second image (step S406), and controls the display device 111 to display the third image on the display device 111 (step S410), followed by terminating the present process.

On the other hand, if it is determined in the step S405 that D0 has not been selected by the user (NO to the step S405), the CPU determines whether or not the display delay time D1 has been selected by the user (step S407). If it is determined in the step S407 that D1 has been selected (YES to the step S407), the CPU controls the first image determination section 115 to select the image B in FIG. 11 as the first image, and controls the image synthesis section 110 to generate the third image by synthesizing the selected first image with the second image (step S408). Then the process proceeds to the step S410.

Further, if it is determined in the step S407 that the display delay time D1 has not been selected (NO to the step S407), the CPU controls the first image determination section 115 to select the image C in FIG. 11 as the first image, and controls the image synthesis section 110 to generate the third image by synthesizing the selected first image with the second image (step S409). Then the process proceeds to the step S410. Note that the method of generating the third image is the same as that used in the first embodiment.

On the other hand, if it is determined in the step S403 that the delay improved display has not been selected (NO to the step S403), the CPU returns to the step S402, and waits until the delay improved display is selected.

According to the process in FIG. 12, when the display delay time allowed by the user is D0 (3 ms), the third image is formed by selecting, as the first image, the image to be used as the first image, which is generated by performing only image processing using the image processor A 103. Alternatively, when the display delay time allowed by the user is D1 (5 ms), the third image is formed by selecting, as the first image, the image B which is generated by performing image processing using the image processor B 105. Further alternatively, when the display delay time allowed by the user is D2 (10 ms), the third image is formed by selecting, as the first image, the image C which is generated by performing image processing using the image processor B 105 and the image processor C 107. That is, an image formed by performing image processing according to the display delay time allowed by the user is selected as the first image to be synthesized with the second image, whereby it is possible to preferably reduce degradation of image quality of the whole display screen within an allowable range of display delay.

Although in the above-described embodiments, the three image processors B 105, C 107, and D 109 have been described as an example of the image processor for generating the second image, the image processor for generating the second image is not particularly limited to these. That is, any other image processor for generating the second image can be employed insofar as it can execute at least one or more image processing operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-204734 filed Oct. 3, 2014, which is hereby incorporated by reference herein in its entirety.

What is claimed is:

1. An image pickup apparatus comprising a memory that stores a program, and at least one processor that executes the program to cause the image pickup apparatus to function as:
an image pickup unit configured to pick up an image of an object;
a development unit configured to generate image data by developing input data acquired by said image pickup unit;
a first generation unit configured to generate a first image by performing image processing on part of the image data as an image of an observed area;
a second generation unit configured to perform predetermined image processing, which has a greater number of processing steps than the image processing performed by said first generation unit, on the image data to thereby generate a second image;
a synthesis unit configured to generate a third image by synthesizing the first image with the second image; and
a display unit configured to display the third image.

2. The image pickup apparatus according to claim 1, wherein the part of the image data is image data corresponding to the observed area set in a display screen of said display unit in advance.

3. The image pickup apparatus according to claim 2, wherein said first generation unit determines a size of the first image and a position of the first image in the whole image data according to the observed area.

4. The image pickup apparatus according to claim 1, wherein the image processing performed by said first generation unit includes at least one of processing for lens distortion aberration correction, noise elimination processing, and color adjustment processing.

5. The image pickup apparatus according to claim 1, wherein said first generation unit determines a number of processing steps of the image processing performed on the part of the image data according to an allowable display delay time period.

6. The image pickup apparatus according to claim 1, wherein said first generation unit generates a plurality of first images by performing respective image processings which are different in processing details, and selects one image from the plurality of generated first images according to a size of a set observed area, and
wherein said synthesis unit synthesizes the selected first image with the second image.

7. The image pickup apparatus according to claim 6, wherein, when the size of the set observed area is a relatively small size, said first generation unit selects an image formed by image processing at a higher level of detail.

8. The image pickup apparatus according to claim 6, wherein said first generation unit generates the plurality of first images by performing the respective image processings which are different in the number of processing steps, on the part of the image data.

9. The image pickup apparatus according to claim 1, wherein, in a case in which the plurality of observed areas are set, said first generation unit generates the first image using a plurality of parts of image data, and said synthesis unit forms the third image by synthesizing the first image formed by the plurality of parts, generated by said first generation unit, with the second image.

10. The image pickup apparatus according to claim 1, wherein said synthesis unit enlarges the first image, and then synthesizes the enlarged first image with the second image to thereby form the third image.

11. The image pickup apparatus according to claim 1, wherein said synthesis unit forms the third image in a manner gradually changing a synthesis ratio at a boundary between the first image and the second image.

12. The image pickup apparatus according to claim 1, wherein said synthesis unit forms the third image by blurring a boundary between the first image and the second image by performing filter processing.

13. The image pickup apparatus according to claim 1, wherein said synthesis unit forms the third image by indicating a boundary between the first image and the second image using frame lines.

14. A method of controlling an image pickup apparatus, the method comprising:
  picking up an image of an object;
  generating image data by developing input data acquired by said picking-up of the image;
  generating a first image by performing image processing on part of the image data as an image of an observed area;
  performing predetermined image processing, which has a greater number of processing steps than the image processing, on the image data to thereby generate a second image;
  generating a third image by synthesizing the first image with the second image; and
  displaying the third image.

\* \* \* \* \*